United States Patent [19]
Hekimian et al.
[11] 3,806,655
[45] Apr. 23, 1974

[54] SYSTEM CARRIER EQUIPMENT EMPLOYING PHASE SHIFT METHOD OF SSB GENERATION AND RECEPTION

[75] Inventors: Norris C. Hekimian, Rockville, Md.; Sidney Browne, Falls Church, Va.; Joseph E. Murtha, Wheaton, Md.

[73] Assignee: Carrier Telephone Corporation of America, Inc., Falls Church, Va.

[22] Filed: July 14, 1972

[21] Appl. No.: 271,738

[52] U.S. Cl. .......... 179/15 FS, 179/2.5 R
[51] Int. Cl. .......... H04j 1/06
[58] Field of Search .......... 179/15 FD, 15 FS, 2.5 R, 179/15 BP; 325/184, 137, 138; 332/45

[56] References Cited

UNITED STATES PATENTS

| | | | |
|---|---|---|---|
| 3,225,316 | 12/1965 | Saraga | 179/15 FS |
| 3,588,361 | 6/1971 | Hurault | 179/2.5 R |
| 3,550,131 | 12/1970 | Kurth | 179/2.5 R |
| 3,450,842 | 6/1969 | Upke | 179/15 BP |

*Primary Examiner*—Kathleen H. Claffy
*Assistant Examiner*—David L. Stewart
*Attorney, Agent, or Firm*—Rose & Edell

[57] ABSTRACT

Multiple adjacent frequency channels employ single sideband AM transmission with re-inserted carrier to afford optimized shared utilization of a common telephone transmission line while adhering to a station carrier frequency standard in which the carriers transmitted from subscribers to the central office reside in a different frequency band than carriers transmitted from the central office to subscribers. The system uses only one stable oscillator per channel, with all other oscillatory signals synchronized thereby. In a preferred embodiment, each subscriber carrier is an integral sub-multiple of the central office carrier for that channel and is obtained by frequency division of the central office carrier. Filtering requirements are minimized by using the phase shift method of SSB generation and reception.

11 Claims, 3 Drawing Figures

SYSTEM CARRIER EQUIPMENT EMPLOYING PHASE SHIFT METHOD OF SSB GENERATION AND RECEPTION

BACKGROUND OF THE INVENTION

The present invention relates to telephone station carrier equipment and, more particularly, to an improved frequency multiplexed telephone system which affords optimum utilization of the allotted frequency band at relatively low cost.

A major problem in the area of multi-channel frequency multiplexing on a common telephone line has been cross talk between channels. In order to minimize cross talk in such systems, the Rural Electrification Administration (REA) has promulgated a frequency standard (see FIG. 1) for station carrier equipment. As illustrated, the band of subscriber carrier frequencies extends from 8 to 56 KHz and is subdivided into 12 4 KHz bands. Likewise, the band of central station carrier frequencies extends from 64 to 136 KHz and is subdivided into 18 4 KHz bands. Since all carrier frequencies on a shared line must be different, the maximum number of channels which can share a common transmission is 12, the maximum number of subscriber carriers.

One of the foremost considerations in the design of station carrier equipment is cost. In multi-channel frequency multiplex equipment, the major cost items are the oscillators which must have highly stable frequencies if the voice signals are to be detected without distortion. To maintain frequency stability it is necessary to regulate the temperature of the oscillator environment. For oscillators located at subscriber locations, where the environmental temperature is relatively uncontrolled, the task of maintaining a constant oscillator temperature requires costly ovens and similar equipment. Somewhat less costly is the task of maintaining a constant temperature oscillator located at the central station; this is because the temperature at the central station is relatively controllable.

Certain frequency multiplex station carrier equipment now in use is able to provide relatively low cost per channel by minimizing the number of stable oscillators required. However, such equipment employs double-sideband AM transmission and, in at least one instance, FM transmission. Double sideband transmission and FM transmission each require more than a 4 KHz band per channel; therefore, it is not possible for 12 channels to share a common transmission line and still meet the REA frequency standard illustrated in FIG. 1. While single sideband AM transmission would permit use of 12 channels on a line, known SSB techniques require four stable and, therefore, costly oscillators per channel (two for transmission, two for detection).

Another high cost in station carrier equipment results from the utilization of many non-identical components in each channel. For example, non-standard narrow band filters can be expensive if purchased in small lots, whereas great savings are possible if standard filters are purchased in large quantities Thus, if each channel requires filters having different passbands, the cost per channel becomes relatively high.

In the system disclosed in U.S. Pat. application Ser. No. 271,737, filed on concurrent date herewith, by Sidney Browne, entitled "Carrier System For Efficient Connection of Telephone Subscribers To Central Office," and assigned to the same assignee as the present invention, there is disclosed a station carrier system which minimizes the number of required stable oscillators and efficiently utilizes the available carrier frequency spectrum. In that system, single sideband (SSB) amplitude modulation (AM) transmission is employed with the carrier being inserted in the transmitted signal to serve as a reference frequency. Each subscriber carrier is an integral sub-multiple of the central office carrier for that channel, permitting the subscriber carrier to be derived, at both the subscriber and central office stations from the central office carrier by means of simple frequency division. By using SSB transmission, 12 4 KHz channels are possible. By deriving the subscriber carrier from the central office reference carrier, only one stable oscillator per channel is required.

It is an object of the present invention to provide a circuit employing the principles described in the aforementioned Browne patent application, yet which utilizes improved techniques and circuitry to further reduce cost and improve system operation.

SUMMARY OF THE INVENTION

In accordance with the present invention, the phase shift method of single sideband signal generation and reception is employed in the system described in the Browne patent application. According to this method, the SSB signal is generated by mixing first and second carrier components, separated in phase by 90°, with respective first and second signal components, also separated in phase by 90°. The resultant double sideband mixer output signals, devoid of carrier components, are summed together resulting in the cancellation of one sideband. The remaining single sideband is then transmitted. Carrier re-insertion is effected by adjusting the d.c. output level of one of the mixers to prevent carrier cancellation at that mixer.

The present invention utilizes individual carrier frequency oscillators for modulation and demodulation at both the central office and subscriber circuits. However, only the central office carrier oscillator is required to be stable by virtue of the fact that the other oscillator frequencies are all ultimately synchronized by the central office carrier signal.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

Figure 1:
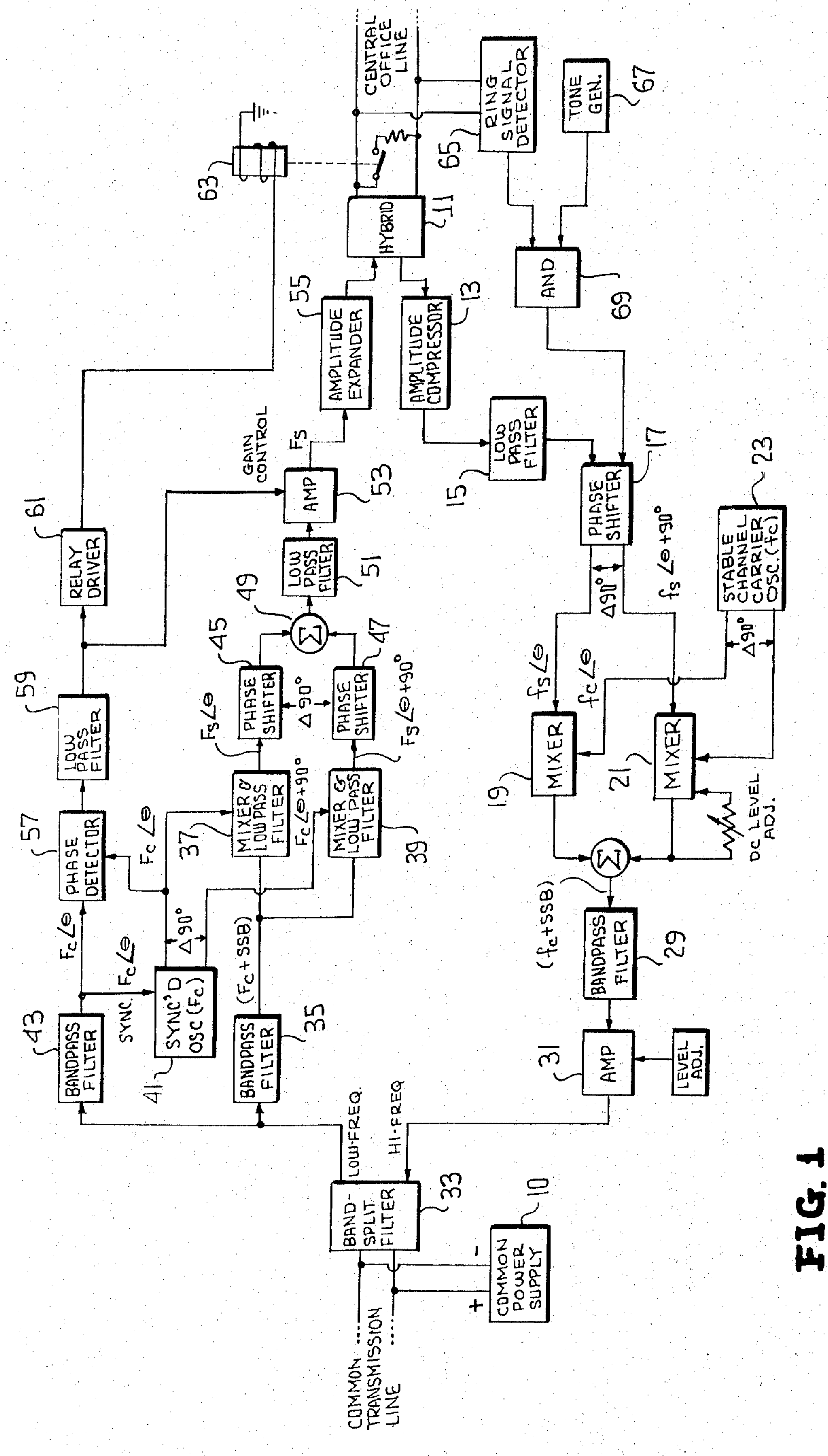
FIG. 1 is a schematic diagram of the central office circuit of one channel, according to the present invention, which channel shares a common telephone transmission line with other channels.
Figures 2, 3:
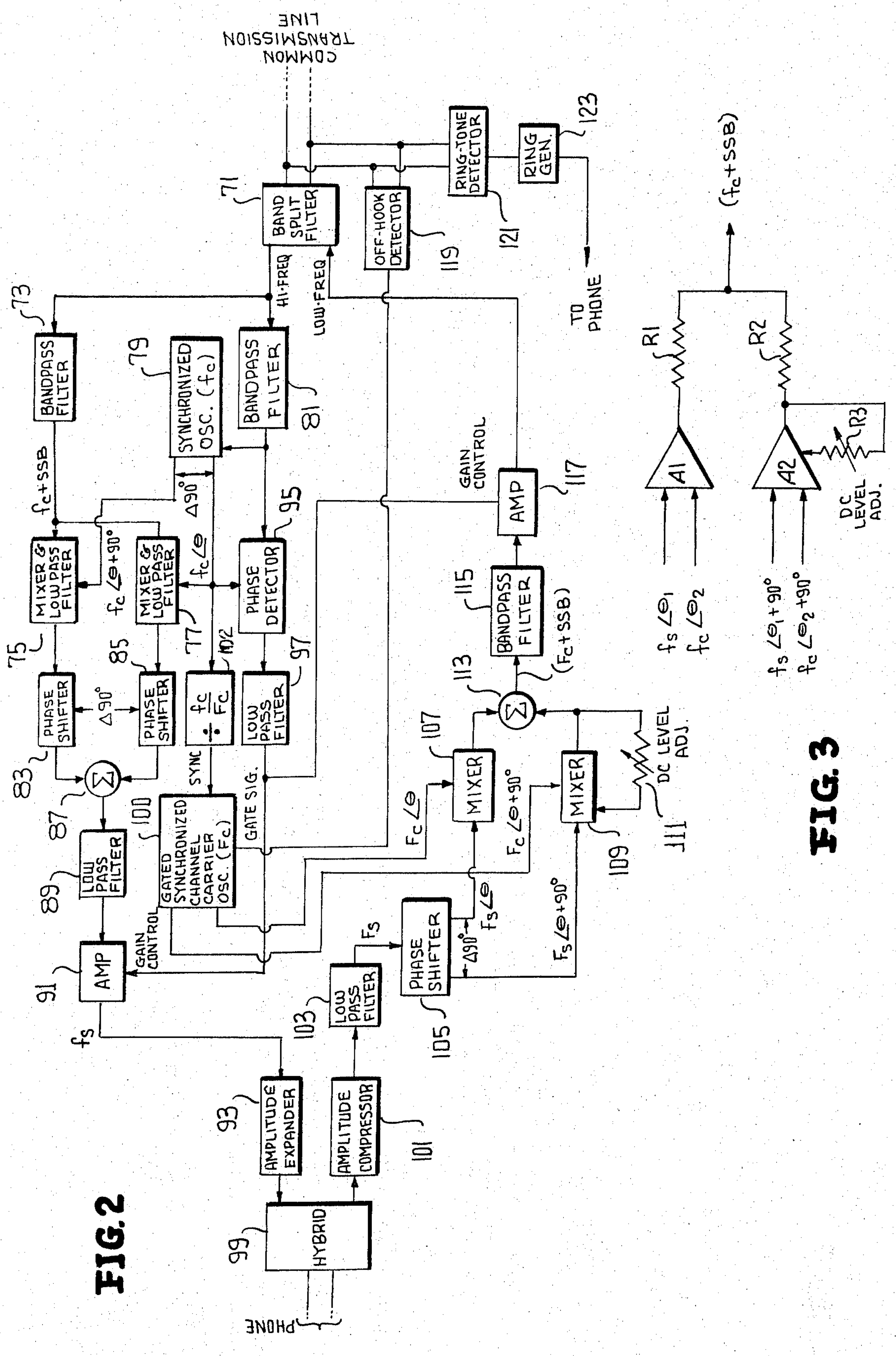
FIG. 2 is a schematic diagram of a subscriber circuit according to the present invention.
FIG. 3 is a detailed schematic of the circuit employed to generate the single sideband signal with re-inserted carrier according to the present invention.

The circuits illustrated in FIGS. 1 and 2 are central office and subscriber circuits, respectively, suitable to be employed in a frequency multiplexed station carrier system. It is understood that the central office circuit of FIG. 1 is representative of plural like circuits sharing the same transmission path, the other central office circuits differing only with respect to their carrier frequencies and components affected thereby. Likewise, the subscriber circuit of FIG. 2 is representative of like circuits sharing the common transmission path and differing only in their carrier frequencies and thusly affected components. For ease in reference, the carrier frequency for transmission from central office to subscriber is designated $f_c$; the carrier frequency for transmission from subscriber to central office is designated $F_c$; the audio signal to be transmitted from central office to carrier is designated $f_s$; and the audio signal to be transmitted from subscriber to central office is designated $F_s$. The bandwidth of the audio signals $f_s$ and $F_s$ are approximately 300 to 3,000 Hz and the bandpass filters employed herein for signal bands have appropriate bandwidths.

Referring specifically to FIG. 1 of the accompanying drawings, the central office circuit for a single channel includes a hybrid coupling circuit 11 via which audio signals, $f_s$, are received from the central office line for that channel and detected audio signals, $F_s$, are applied to that central office line. Incoming signals are applied to an amplitude compressor circuit 13. As is well known, compressor 13 imparts more gain to low-intensity signals than high intensity signals, thereby reducing the amplitude range of signals to be transmitted to the subscriber circuit. A companion expandor at the subscriber circuit (see element 93, FIG. 2) restores the signal to its original dynamic range. The overall effect is to improve the signal-to-noise ratio in the channel by raising the relatively weak and noise-susceptible signals out of the noise amplitude range.

The compressed audio signal is passed through low pass audio filter 15 to phase shifter 17 which splits the audio signal into two components, $f_s \angle\theta$ and $f_s \angle\theta + 90°$, which are separated in phase by 90° but are otherwise identical. These signal components are applied to respective balanced mixers 19 and 21. A stable carrier frequency oscillator 23 having a frequency $f_c$ provides two identical carrier signal components $f_c \angle\theta$ and $f_c \angle\theta + 90°$, separated in phase by 90°. These carrier components are also applied to respective mixers 19, 21. The output signal from mixer 19 is in the form of double sideband suppressed carrier (DSBSC), wherein the two sidebands of opposite phase. Ignoring for a moment the presence of the DC LEVEL ADJ potentiometer 25 at mixer 21, this mixer also provides a DSBSC signal, wherein the sidebands are of opposite phase. As described by Norgaard (in "The Phase-Shift Method of Single-Sideband Signal Generation," Proc. of IRE, vol. 44, No. 12, Dec. 1956, p.1,718), if the two DSBSC signals are summed, as indicated by summing circuit 27, a phase discrimination process ensues wherein one sideband is cancelled and the other is reinforced. In fact, excellent rejection of the cancelled sideband is achieved for most purposes.

The presence of the DC LEVEL ADJ potentiometer 25 in the feedback circuit of mixer 21 effectively unbalances mixer 21 relative to the carrier $f_c$. The carrier is thus not cancelled at mixer 21 and passes through summing network 21 with the sideband signal. The carrier has thus been re-inserted without requiring significant additional circuitry. The mixer circuit is described in detail subsequently in relation to FIG. 3.

The output signal from summing network 27 includes the carrier and a single sideband and is designated in the drawing as ($f_c$ + SSB). This signal is passed through a bandpass filter 29, tuned to the center of the sideband, and is amplified at amplifier 31 before being applied to the common transmission line via the high frequency port of band splitter or hi/lo filter 33. The transmitted signal is processed at the subscriber circuit in a manner described subsequently in relation to FIG. 2. As mentioned, a plurality of SSB signals, each with a reinserted carrier, are transmitted via the same common transmission line, the signals each being translated up to a different carrier frequency. Likewise, SSB signals with respective re-inserted carriers are transmitted from the subscriber circuits to respective central office circuits via the common transmission line. For present purposes it is assumed that the central office carriers reside in a higher frequency range than the subscriber carriers. In fact, the subscriber carrier frequency $F_c$ in each channel is an integral sub-multiple of the central office carrier frequency $f_c$ in that channel. The importance of this relationship will become clear in relation to FIG. 2 to be described subsequently.

Signals transmitted in the subscriber carrier frequency band are received at the low frequency port of band splitter filter 33 in FIG. 1. Since only signals from one related subscriber circuit, having a carrier frequency $F_c$, are to be detected, bandpass filter 35 is provided to pass only those received signals in the single sideband of $F_c$. Another bandpass filter 43, tuned only to the carrier $F_c$, passes the received carrier for synchronization and control purposes.

The SSB signal passed by filter 35 is applied to two balanced mixer circuits 37 and 39 which, to conserve space in the drawing, are illustrated as including respective low pass filters. Mixer 37 also receives a carrier frequency component $F_c \angle\theta$ from oscillator 41; mixer 39 receives an identical but 90° phase-shifted carrier component $F_c \angle\theta + 90°$ from oscillator 41. Oscillator 41 has a nominal frequency of $F_c$ and is synchronized precisely to the received carrier by the output signal ($F_c \angle\theta$) from bandpass filter 43. Synchronization may be effected by any suitable technique, including phase injection, phase-lock loop, etc. Since it is externally synchronized, oscillator 41 need not be highly stable and is therefore much less costly than stable oscillator 23.

The low pass filters associated with balanced mixers 37, 39 pass detected audio signals to respective phase shifters 45, 47 which in turn provide respective identical audio signals which are mutually shifted in phase by 90°. These signals are summed at network 49 to provide a single detected audio band $F_s$. This method of receiving SSB signals is described by Norgaard (in "The Phase-shift Method of Single-Sideband Signal Reception," Proc. of IRE, vol. 44, No. 12, Dec. 1956, p.1,735) and results in accurate detection of the audio signal. This signal is then passed through low pass audio filter 51 and is amplified by amplifier 53 before being applied to amplitude expandor 55. The latter is a companion to compressor 101 in FIG. 2 and serves to restore the amplitude range of the audio signal before it is coupled to the central office line via hybrid coupler 11.

The received carrier signal component $F_c \angle\theta$ passed by filter 43 is also applied to a phase detector 57 along with the locally generated $F_c \angle\theta$ component from synchronized oscillator 41. Since both input signals to phase detector 57 are in phase, its output signal is a d.c. level proportional to the level of the received subscriber carrier and is present as long as the subscriber carrier is received at filter 43. This occurs whenever the subscriber's phone is off-hook. The phase detector output signal is smoothed by low pass filter 59 and applied to amplifier 53 as a gain control signal. In this manner the audio signal applied to the central office line has its amplitude regulated in accordance with the amplitude of the received carrier. This compensates for cable losses in the transmission line which is necessary when subscriber locations are at different distances from the central office.

The smoothed d.c. signal from phase detector 57 is also applied to relay driver 61 which in turn actuates relay 63 whenever the subscriber carrier is received. Relay 63, in turn, closes a contact across the central office line to indicate that the subscriber is off-hook.

Referring now to FIG. 2 of the accompanying drawings, central office carrier band signals applied to the common transmission line are received at the subscriber circuit at the high frequency port of band splitter filter 71. The proper central office carrier and sideband are selected by filters 81 and 73 respectively. The output signal from bandpass filter 73 is the single sideband of the central office carrier and is applied to each of balanced mixers 75 and 77, which are illustrated as including low pass output filters. The output signal from filter 81 is the received carrier $f_c$ which is applied as a synchronization signal to a synchronized oscillator 79. The latter has a nominal frequency of $f_c$ and is locked to the received carrier by means of phase injection, phase lock loop, or similar technique. The output signals from oscillator 79 are $f_c \angle\theta$ and $f_c \angle\theta + 90°$ which are separated in phase by 90°; these signals are applied to mixers 77 and 75 respectively. In a manner analogous to the operation of mixers 37 and 39, phase shifters 45 and 47, and summing network 49 of FIG. 1, the output signals from mixers 75 and 77 are applied to phase shifters 83 and 85. The phase shifter output signals are summed at network 87 to provide the detected audio band signal $f_s$. This signal is in turn passed through low pass audio filter 89 and is amplified by amplifier 91 before being applied to amplitude expandor 93. Expandor 93 restores the dynamic range of the audio signal and applies it, via hybrid coupler 99, to the subscriber's phone.

Gain control for amplifier 91 is effected by the received carrier $f_c$ in the manner described in relation to controlling the gain of amplifier 53 in FIG. 1. Specifically, the received carrier $f_c$ separated from the base band by filter 81 is applied to phase detector 85 along with a signal of like phase from synchronized oscillator 79. The d.c. output level from the phase detector, which depends upon the level of the received carrier, is smoothed and applied to amplifier 91 as a gain control signal.

Audio signals originating at the subscriber's phone are received at hybrid coupler 99 and applied to amplitude compressor 101 where the amplitude range is compressed. The compressed signals are passed through low pass audio filter 103 to phase shifter 105 which is similar to phase shifter 17 of FIG. 1. The two 90° phased components $F_s \angle\theta$ and $F_s \angle\theta + 90°$ which are provided by phase shifter 105 are applied to balanced mixers 107 and 109, respectively.

The other signals applied to mixers 107 and 109 are derived from a synchronized oscillator 100 which serves as the subscriber carrier oscillator for the channel. Synchronization of oscillator 100 is derived from oscillator 79, which itself is synchronized by the stable central office carrier oscillator 23. Specifically, one output phase of oscillator 79 is applied for frequency divider 102 which has an integral division ratio equal to $f_c/F_c$. The output signal from frequency divider 102 is thus at frequency $F_c$ and is synchronized to the central office carrier $f_c$. The divider signal is used to synchronize the frequency of oscillator 100, by phase injection, phase lock loop, etc.

Oscillator 100 provides two 90° spaced components $F_c \angle\theta$ and $F_c \angle\theta + 90°$ which are applied to balanced mixers 107 and 109, respectively. These mixers, along with DC LEVEL ADJ potentiometer 111 and summing network 113 provide a resultant SSB signal with inserted carrier ($F_c$ + SSB) in the same manner described above for mixers 19 and 21, potentiometer 25 and summing network 27. The SSB and carrier are passed through bandpass filter 115 and amplified by amplifier 117 before being applied to the common transmission line via the low frequency side of band splitter filter 71.

An off-hook detector 119 is connected across the subscriber's phone lines and senses the off-hook condition. When the subscriber's phone is detected as being off-hook, detector 119 provides a signal which gates on the synchronized subscriber carrier oscillator 100. The subscriber carrier is therefore not transmitted to the central office unless the subscriber's phone is off-hook; therefore relay 63 (FIG. 1) which is operated only when the central office circuit receives the subscriber carrier, is energized only when the subscriber phone is off-hook.

Referring again to FIG. 1, when the subscriber is being called, the central office applies a ring signal (nominally 90 volts peak to peak at 20 Hz) to the central office line for that subscriber. When this is received at the central office circuit of FIG. 1 it is detected by ring signal detector 65. The latter then generates a d.c. signal which enables AND gate 69 to pass a ring tone supplied by ring tone generator 67. The gated ring tone is applied to phase shifter 17 and follows the same path as audio signal $f_s$ to be transmitted to the subscriber as part of the single sideband signal.

Referring to FIG. 2, the ring tone appearing in the subscriber's frequency band is detected by ring tone detector 121 which in turn actuates a ring generator 123 causing the subscriber's phone to ring.

Referring now to FIG. 3, the circuit for generating the single sideband and inserted carrier signal includes two operational amplifiers A1 and A2. These amplifiers may, for example, be model CA 3010 A manufactured by RCA. Each operates in the present system as a chopper wherein the audio signal $f_s$ is chopped at the rate of the carrier frequency. Specifically, amplifier A1 receives one component of the audio signal, $f_s \angle\theta$, and one component of the carrier signal $f_c \angle\theta_2$. Amplifier A2 receives the other components of the audio and carrier signals, $f_s \angle\theta_1 + 90°$ and $f_c \angle\theta_2 + 90°$, respectively. The chopped signals are resistively coupled to provide the output signal. The DC LEVEL ADJ potentiometer, designated as R3, is part of a feedback circuit for amplifier A2. For the RCA amplifier model CA3010A, R3 is connected between pins 9 and 6.

If amplifiers A1 and A2 are perfectly balanced as to both signals, the output signal of each amplifier includes only the two sidebands and is devoid of pure carrier. This is because the carrier signal has equal positive and negative portions which cancel one another out. By adjusting the d.c. level of the output signal of amplifier A2, however, the opposite polarities do not cancel and a net pure carrier component remains. This component is combined with the single sideband which is reenforced and the two amplifier output signals are summed.

As described in the aforementioned patent application by Browne, the single sideband approach as described herein permits efficient utilization of the frequency band. Moreover, it permits twelve channels to share a common transmission line and still meet the Rural Electrification Administration (REA) frequency standard which limits subscriber carriers to a frequency band between 8 and 56 KHz and central office carriers to 64 KHz and above.

Importantly, this is accomplished with the utilization of only one stable oscillator per channel, since the subscriber carrier is derived from the central office carrier. Moreover, the phase shift method of generating and detecting SSB signals requires less critical filtering because of the inherent cancellation of the unwanted sideband. Filter 29, for example, can have a much lower Q and is much less expensive than the filters employed in the more conventional SSB techniques where unwanted sideband elimination is effected entirely by filtering.

It is also within the scope of the present invention to utilize a single stable oscillator and appropriate frequency dividers to generate all of the central office carriers for different channels. Likewise, where the same central office location services more one shared transmission line, the same stable source (or sources) may be utilized to provide the same carrier frequencies for the different groups of channels. Thus, if one group of 12 channels share one transmission line, and a second group of 12 channels share a second transmission line, the same stable central office carrier oscillators may serve both groups.

While we have described and illustrated specific embodiments of our invention, it will be clear that variations of the details of construction which are specifically illustrated and described may be resorted to without departing from the true spirit and scope of the invention as defined in the appended claims.

We claim:

1. Electronic apparatus for use in a frequency-multiplexed carrier telephone system and adapted to be placed at subscriber stations located remote from central station telephone equipment, said apparatus comprising a modulation-demodulation circuit characterized by the absence of an independent frequency-stable oscillator and including:

a circuit junction adapted to be connected to a telephone line;

a first narrow band filter connected to said circuit junction and tuned to pass only carrier signal at a first carrier frequency;

a first synchronized oscillator arranged to receive carrier signal from said first filter and provide two signals at the frequency of said received carrier signal and separated in phase by 90°;

a second bandpass filter connected to said circuit junction and tuned to pass only signals in a single sideband of said first carrier frequency;

a phase shift demodulator connected to receive signals passed by said second filter and said two phase-separated signals from said first synchronized oscillator to provide audio output signal at the difference frequencies between the carrier signal passed by said first filter and the single sideband passed by said second filter;

a frequency divider connected to receive one of said two signals from said first synchronized oscillator and to provide a second carrier signal at a second carrier frequency which is an integral sub-multiple of said first carrier frequency;

a second synchronized oscillator arranged to receive said second carrier signal from said frequency divider and provide a first pair of signals at the same frequency of said received second carrier signal and separated in phase by 90°;

a phase shifter arranged to receive audio signals from externally of said circuit and provide a second pair of signals, each corresponding in frequency to said received audio signals but separated in phase by 90°;

a phase-shift modulator arranged to receive said first and second pairs of signals and to provide an output signal of frequencies within a single sideband of said second carrier frequency; and means for coupling said output signal to said circuit generation.

2. A frequency multiplexed carrier communications system of the type employing a common transmission line and a plurality of pairs of first and second communications stations, each first station being connected to one end of said common transmission line and being arranged to communicate via said transmission line with second station with which it is paired, said second stations being connected to the opposite end of said transmission line, wherein signals transmitted from each first station to its paired second station utilize a first carrier frequency which is different for each station pair, and signals transmitted from each second station to its paired first station utilize a second carrier frequency which is different for each station pair, said system being characterized by:

a single stable oscillator for each station pair located at said first station for providing a first carrier signal at said first carrier frequency;

means for applying said first carrier signal to said common transmission line;

frequency divider means located at each second station arranged to receive the first carrier signal applied to said common transmission line by the first station paired with said each second station for dividing the frequency of said first carrier signal and providing a second carrier signal at said second carrier frequency; and phase shift modulation means located at each first and second station for generating single sidebands of said first and second carrier frequencies, respectively;

said first stations each including:

first and second balanced mixers;

phase shift means responsive to said first carrier signal for providing two 90°-phase-separated replicas of said first carrier signal;

means for applying said replicas of said first carrier signal to said first and second balanced mixers, respectively;

further phase shift means responsive to externally-derived information signal for providing two 90° phase-separated replicas thereof;

means for applying said replicas of said information signal to said first and second balanced mixers; respectively;

means for summing the output signals from said balanced mixers to provide said single sideband of said first carrier frequency; and means for applying said single sideband of said first carrier frequency to said common transmission line;

said second stations each including:

third and fourth balanced mixers;

phase shift means responsive to said second carrier signal provided by said frequency divider means for providing two 90°-phase-separated replicas of said second carrier signal;

means for applying said two replicas of said second carrier signal to said third and fourth balanced mixers, respectively;

further phase shift means responsive to further externally-derived information signal for providing two 90°-phase-separated replicas of said further information signal;

means for applying said replicas of said further information to said third and fourth balanced mixers, respectively;

means for summing the output signals from said third and fourth balanced mixers to provide said single sideband of said second carrier frequency;

means for applying said single sideband of said second carrier frequency to said common transmission line; and receiver means arranged to receive from said common transmission line and process only the one single sideband which is transmitted from that first station which is paired with said each second station; and receiver means located at each first station arranged to receive from said common transmission line and process only the one single sideband which is transmitted from that second station which is paired with said each first station.

3. The system according to claim 2 wherein:

said receiver means located at each first station comprises:

a filter connected to said transmission line for passing the single sideband of said second carrier signal applied to said transmission line at the second station paired with said each first station;

synchronized oscillator means responsive to said first carrier signal provided by said stable oscillator for providing two 90°-phase-separated replicas of said first carrier signal;

fifth and sixth balanced mixers;

means for applying said two replicas of said first carrier signal to said fifth and sixth balanced mixers, respectively;

means for applying the signal passed by said filter to said fifth and sixth balanced mixers;

means for filtering the output signals from said fifth and sixth balanced mixers to provide two demodulated signal bands devoid of said second carrier frequency;

phase shifter means for shifting said two demodulated signal bands to provide a relative spacing of 90° therebetween;

means for summing the 90°-spaced signal bands to provide a single detected band;

said receiver means located at each second station comprising:

a further filter connected to said transmission line for passing the single sideband of said first carrier signal applied to said transmission line at the first station paired with said each second station;

a narrow band filter connected to said transmission line for passing the first carrier signal utilized by the first station paired with said each second station;

synchronized oscillator means responsive to said first carrier signal passed by said narrow band filter for providing two 90°-phase-separated replicas of said first carrier signal;

seventh and eighth balanced mixers;

means for applying said two replicas of said first carrier signal to said seventh and eighth balanced mixers, respectively;

means for applying the signal passed by said further filter to said seventh and eighth balanced mixers;

means for filtering the output signals from said seventh and eighth balanced mixers to provide two demodulated signal bands devoid of said first carrier frequency;

phase shifter means for shifting said two demodulated signal bands to provide a relative spacing of 90° therebetween; and means for summing the 90°-spaced signal bands to provide a single detected band.

4. The system according to claim 3, each station pair being further characterized in that its first carrier frequency and its second carrier frequency are related by an integral factor.

5. The system according to claim 4 wherein said first and third mixers each include a chopper wherein said externally derived information signal is chopped at the rate of said first carrier frequency, and wherein said adjustable means comprises means for varying the d.c. level of the output signal of said chopper.

6. The system according to claim 3, each station pair being further characterized in that its first carrier frequency is an integral multiple of its second carrier frequency, said frequency divider having a frequency division factor equal to said integral multiple.

7. The system according to claim 6 employed as a telephone carrier system wherein said common transmission line is a telephone line, wherein said station pairs are 12 in number, said second carrier frequencies being spaced 4 KHz apart between 8 and 56 KHz, said first carrier frequencies being integral multiples of 4 KHz which are greater than 60 KHz.

8. The system according to claim 2 further comprising adjustable means for selectively de-tuning said first mixer to permit passage of said first carrier signal therethrough, and further adjustable means for selectively de-tuning said third mixer to permit passage of said second carrier signal therethrough.

9. A frequency-multiplexed carrier telephone system of the type employing a common telephone line to service a plurality of subscriber stations from a respective plurality of central stations located at a central telephone office, said subscriber stations being paired with respective central stations for purposes of communication, each central station being assigned a different transmit carrier frequency lying within a first range of frequencies and a different receive carrier frequency lying within a second range of frequencies which does not overlap said first range of frequencies, each subscriber station being assigned a different transmit carrier frequency corresponding to the receive carrier frequency of its paired central station and a different receive carrier frequency corresponding to the transmit carrier frequency of its paired central station, said system being characterized by the need for no more than one stable oscillator to be utilized with each paired combination of subscriber station and central station, and by the fact that the receive carrier frequency of each central station is an integral sub-multiple of the transmit carrier frequency of the central station, said system including:

at each central station:

first and second balanced mixers;

first phase shift means responsive to the central station transmit carrier for providing two 90°-phase-separated replicas of the central station transmit carrier;

means for applying said replicas to said first and second balanced mixers, respectively;

second phase shift means responsive to externally supplied information signal for providing two 90°-phase-separated replicas of said information signal;

means for applying said replicas of said information signal to said first and second balanced mixers, respectively;

means for summing the output signals from said first and second balanced mixers to provide a single sideband of said central station carrier frequency;

means for de-tuning said first balanced mixer sufficiently to provide a central station carrier component combined with the single sideband provided by said summing means; and means for applying said single sideband of said central station carrier combined with said central station carrier component to said common telephone line; and at each subscriber station:

filter means connected to said telephone line for passing only the transmit carrier of the central station with which said each subscriber station is paired;

a frequency divider responsive to the central station transmit carrier passed by said filter means for providing said subscriber station transmit carrier at a frequency which is an integral sub-multiple of said central station transmit carrier;

third and fourth balanced mixers;

third phase shift means responsive to said subscriber transmit carrier provided by said frequency divider for providing two 90°-phase-separated replicas of said subscriber transmit carrier;

means for applying said two replicas of said subscriber transmit carrier to said third and fourth balanced mixers, respectively;

fourth phase shift means responsive to further externally supplied information signal for providing two 90°-phase-separated replicas of said further information signal;

means for applying said replicas of said further information signal to said third and fourth balanced mixers, respectively;

means for summing the output signals from said third and fourth balanced mixers to provide said single sideband of said subscriber transmit carrier;

means for applying said single sideband of said subscriber transmit carrier to said common telephone line; and receiver means arranged to receive from said common telephone line and process only the one single sideband which is transmitted from that central station which is paired with said each subscriber station; and receiver means located at each central station arranged to receive from said common telephone line and process only the one single sideband which is transmitted from that subscriber station which is paired with said each central station.

10. The system according to claim 9 wherein:

said receiver means located at each central station comprises:

a filter connected to said telephone line for passing the single sideband of said subscriber transmit carrier applied to said telephone line at the subscriber station paired with said each central station;

means responsive to said central station transmit carrier signal provided by said stable oscillator for providing two 90°-phase-separated replicas of said central station transmit carrier;

fifth and sixth balanced mixers;

means for applying said two replicas of said central station transmit carrier to said fifth and sixth balanced mixers, respectively;

means for applying the signal passed by said filter to said fifth and sixth balanced mixers;

means for filtering the output signals from said fifth and sixth balanced mixers to provide two demodulated signal bands devoid of said subscriber station transmit carrier;

fifth phase shift means for shifting said two demodulated signal bands to provide a relative spacing of 90° therebetween;

means for summing the 90°-spaced signal bands to provide a single detected band; and said receiver means located at each subscriber station comprising:

a further filter connected to said telephone line for passing the single sideband of said subscriber transmit carrier applied to said telephone line at the central station paired with said each subscriber station;

a narrow band filter connected to said telephone line for passing the central station transmit carrier utilized by the central station paired with said each subscriber station;

means responsive to said subscriber transmit carrier passed by said narrow band filter for providing two 90°-phase-separated replicas of said subscriber transmit carrier;

seventh and eighth balanced mixers;

means for applying said two replicas of said central station transmit carrier to said seventh and eighth balanced mixers, respectively;

means for applying the signal passed by said further filter to said seventh and eighth balanced mixers;

means for filtering the output signals from said seventh and eighth balanced mixers to provide two demodulated signal bands devoid of said central station carrier;

sixth phase shift means for shifting said two demodulated signal bands to provide a relative spacing of 90° therebetween; and means for summing the 90°-spaced signal bands to provide a single detected band.

11. The system according to claim 10 wherein there are 12 central stations and 12 subscriber stations, said subscriber transmit carriers being spaced 4 KHz apart between 8 and 56 KHz, said central station transmit carriers being integral multiples of 4 KHz and greater than 60 KHz.

* * * * *